United States Patent
Kagarlitsky et al.

(10) Patent No.: US 12,323,571 B2
(45) Date of Patent: Jun. 3, 2025

(54) METHOD OF TRAINING A NEURAL NETWORK CONFIGURED FOR CONVERTING 2D IMAGES INTO 3D MODELS

(71) Applicant: TETAVI LTD., Tel-Aviv (IL)

(72) Inventors: Vsevolod Kagarlitsky, Ramat Gan (IL); Shirley Keinan, Tel Aviv (IL); Michael Birnboim, Holon (IL); Amir Green, Mitzpe Netofa (IL); Alik Mokeichev, Tel Aviv (IL); Michal Heker, Tel-Aviv (IL); Yair Baruch, Tel Aviv (IL); Gil Wohlstadter, Givataim (IL); Gilad Talmon, Givataim (IL); Michael Tamir, Tel Aviv (IL)

(73) Assignee: TETAVI LTD., Tel-Aviv (IL)

( * ) Notice: Subject to any disclaimer, the term of this patent is extended or adjusted under 35 U.S.C. 154(b) by 77 days.

(21) Appl. No.: 17/566,623

(22) Filed: Dec. 30, 2021

(65) Prior Publication Data

US 2022/0217321 A1    Jul. 7, 2022

Related U.S. Application Data

(60) Provisional application No. 63/134,207, filed on Jan. 6, 2021.

(51) Int. Cl.
*H04N 13/275* (2018.01)
*G06T 7/579* (2017.01)
*H04N 13/172* (2018.01)

(52) U.S. Cl.
CPC ........... *H04N 13/275* (2018.05); *G06T 7/579* (2017.01); *H04N 13/172* (2018.05); *G06T 2207/20081* (2013.01); *G06T 2207/20084* (2013.01)

(58) Field of Classification Search
CPC ......... G06T 13/40; G06T 15/20; G06T 17/00; G06T 2207/20081; G06T 2207/20084;
(Continued)

(56) References Cited

U.S. PATENT DOCUMENTS

2010/0111370 A1* 5/2010 Black .................. G06F 18/2321
705/26.1
2017/0103563 A1* 4/2017 Erukhimov ............. G06T 15/04
(Continued)

FOREIGN PATENT DOCUMENTS

| CN | 107067452 A | 8/2017 |
|---|---|---|
| KR | 20170074413 A | 6/2017 |
| WO | 2018067978 A1 | 4/2018 |

OTHER PUBLICATIONS

International Search Report of PCT/IL2022/050012 Completed Mar. 14, 2022; Mailed Mar. 23, 2022 3 pages.
(Continued)

*Primary Examiner* — Ming Wu
(74) *Attorney, Agent, or Firm* — The Roy Gross Law Firm, LLC; Roy D. Gross

(57) ABSTRACT

A computer-implemented method of generating of a database for training a neural network configured for converting 2d images into 3d models comprising steps of: (a) obtaining 3d models; (b) rendering said 3d models in a 2d format from at least one view point; and (c) collecting pairs further comprising said rendered 2d image frame and said corresponding sampled 3d models each.

15 Claims, 3 Drawing Sheets

(58) Field of Classification Search
CPC ......... G06T 7/55; G06T 7/579; H04N 13/172; H04N 13/261; H04N 13/275
See application file for complete search history.

(56) References Cited

U.S. PATENT DOCUMENTS

| | | | | |
|---|---|---|---|---|
| 2020/0151963 A1* | 5/2020 | Lee | .......................... | G06T 7/149 |
| 2020/0193677 A1* | 6/2020 | Vaganov | ................. | A63F 13/65 |
| 2020/0380771 A1* | 12/2020 | Kim | ....................... | G06T 17/20 |

OTHER PUBLICATIONS

Written Opinion of PCT/IL2022/050012 Completed Mar. 14, 2022; Mailed Mar. 23, 2022 4 pages.
Gül Varol, Javier J Romero, Xavier Martin, Naureen Mahmood, Michael J. Black, et al.. Learning from Synthetic Humans. 2017 IEEE Conference on Computer Vision and Pattern Recognition (CVPR 2017), Jul. 2017, Honolulu, United States. pp. 4627-4635, doi: 10.1109/CVPR.2017.492.
European Patent Office, Supplementary European Search Report for European Patent Application No. 22736708, completed Aug. 21, 2024, 2pp.
European Patent Office, Search Opinion for European Patent Application No. 22736708, 4pp.
European Patent Office, Information on Search Strategy for European Patent Application No. 22736708, 1pg.

* cited by examiner

METHOD OF TRAINING A NEURAL NETWORK CONFIGURED FOR CONVERTING 2D IMAGES INTO 3D MODELS

CROSS REFERENCE TO RELATED APPLICATIONS

This application claims the benefit of priority of U.S. Provisional Patent Application No. 63/134,207, filed Jan. 6, 2021, the contents of which are all incorporated herein by reference in their entirety.

FIELD OF THE INVENTION

The present invention relates to image processing by neural networks, and, more specifically, to converting 2d image frames into 3d models.

BACKGROUND OF THE INVENTION

The technology maintaining virtual/augmented reality content has become a hot technology in the current society and has been applied to various scenes of life. 3D content is poor and its high cost of shooting is restricting the development of the current 3D video main factor.

It is known in the art that the neural networks can be used for converting 2d images into volumetric ones. For example, CN 10706745 discloses a method for converting a 2D film into a 3D film based on a full convolutional neural network. The method comprises the following steps: 1) extracting the 2D image of each frame in a photographed film's 2D video; 2) using the full convolutional neural network to extract the characteristics of the 2D image of each frame and calculating the depth value; 3) coloring the 2D image of each frame according to its depth value to generate a corresponding 3D image; and 4) integrating all the 3D images in succession to develop a 3D film.

The fidelity of the conversion performed by the neural network depends on the database used for neural network training. Thus, there is a long-felt and unmet need for providing the database of pairs of input 2d images and output 3d models usable for training the neural network.

SUMMARY OF THE INVENTION

It is hence one object of the invention to disclose a computer-implemented method of generating of a database for training a neural network configured for converting 2d images into 3d models. The database comprises a collection of said 2d images and 3d models corresponding thereto. The aforesaid method comprising steps of: (a) obtaining 3d models by means of at least one of the following: (i) obtaining a 3d model of at least one character in a predetermined pose, rigging and skinning said 3d model and moving said 3d model into poses of interest; (ii) capturing a number of volumetric image frames of said at least one character in static poses, (iii) capturing a volumetric video of said at least one character being in motion; said at least one character at sub-steps i to iii being identical to each other or differs from each other; (b) rendering said 3d models in a 2d format; and (c) collecting pairs further comprising said rendered 2d image frame and said corresponding sampled 3d model each.

A further object of the present invention is to provide the method according to claim 1 comprising sampling said 3d models obtained at step a.

A further object of the present invention is to provide the rigging and skinning said 3d model performed by projecting said 3d model to at least one 2d image calculating a 3d pose estimation based thereon.

A further object of the present invention is to provide the rigging and skinning said 3d model performed in an automatic manner.

A further object of the present invention is to provide the database usable for training a neural network configured for converting 2d images into 3d models.

A further object of the present invention is to provide the static poses defined in an unlimited manner as T-poses, or A-poses.

A further object of the present invention is to provide a computer-implemented system for generating of a database for training a neural network configured for converting 2d images into 3d models. The database comprises a collection of said 2d images and 3d models corresponding thereto. The said computer-implemented system comprises: (a) a processor; (b) a memory storing instructions which, when executed by said processor, direct said processor to performing steps of: (i) obtaining 3d models by means of at least one of the following: (1) obtaining a 3d model of at least one character in a predetermined pose, rigging and skinning said 3d model and moving said 3d model into poses of interest; (2) capturing a number of volumetric image frames of said at least one character in static poses, (3) capturing a volumetric video of said at least one character being in motion; said at least one character at sub-steps 1 to 3 being identical to each other or differs from each other; (ii) rendering said 3d models in a 2d format; and (iii) collecting pairs further comprising said rendered 2d image frame and said corresponding sampled 3d model each.

A further object of the present invention is to provide a non-transitory computer readable medium comprising instructions to a processor for performing a method of training a neural network configured for converting 2d images into 3d models. The aforesaid instructions comprise steps: (a) obtaining 3d models by means of at least one of the following: (i) obtaining a 3d model of at least one character in a predetermined pose, rigging and skinning said 3d model and moving said 3d model into poses of interest; (ii) capturing a number of volumetric image frames of said at least one character in static poses, (iii) capturing a volumetric video of said at least one character being in motion; said at least one character at sub-steps i to iii being identical to each other or differs from each other; (b) rendering said 3d models in a 2d; and (c) collecting pairs further comprising said rendered 2d image frame and said corresponding sampled 3d model each.

BRIEF DESCRIPTION OF THE DRAWINGS

In order to understand the invention and to see how it may be implemented in practice, a plurality of embodiments is adapted to now be described, by way of non-limiting example only, with reference to the accompanying drawings, in which.

DETAILED DESCRIPTION OF THE INVENTION

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide a computer-implemented method of generating of a database for training a neural network configured for converting 2d images into 3d models, a computer-implemented system for implementing the aforesaid method and a non-transitory computer readable medium comprising instructions to a processor for performing the aforesaid method.

The purpose of the present invention is to provide a tool which is able to convert 2d images into 3d models by means of processing in a neural network. The more specific problem to be solved by the present invention is creating a database for training the neural network such that the user-defined 2d image is converted by the neural network into 3d model with high fidelity.

Figure 1:
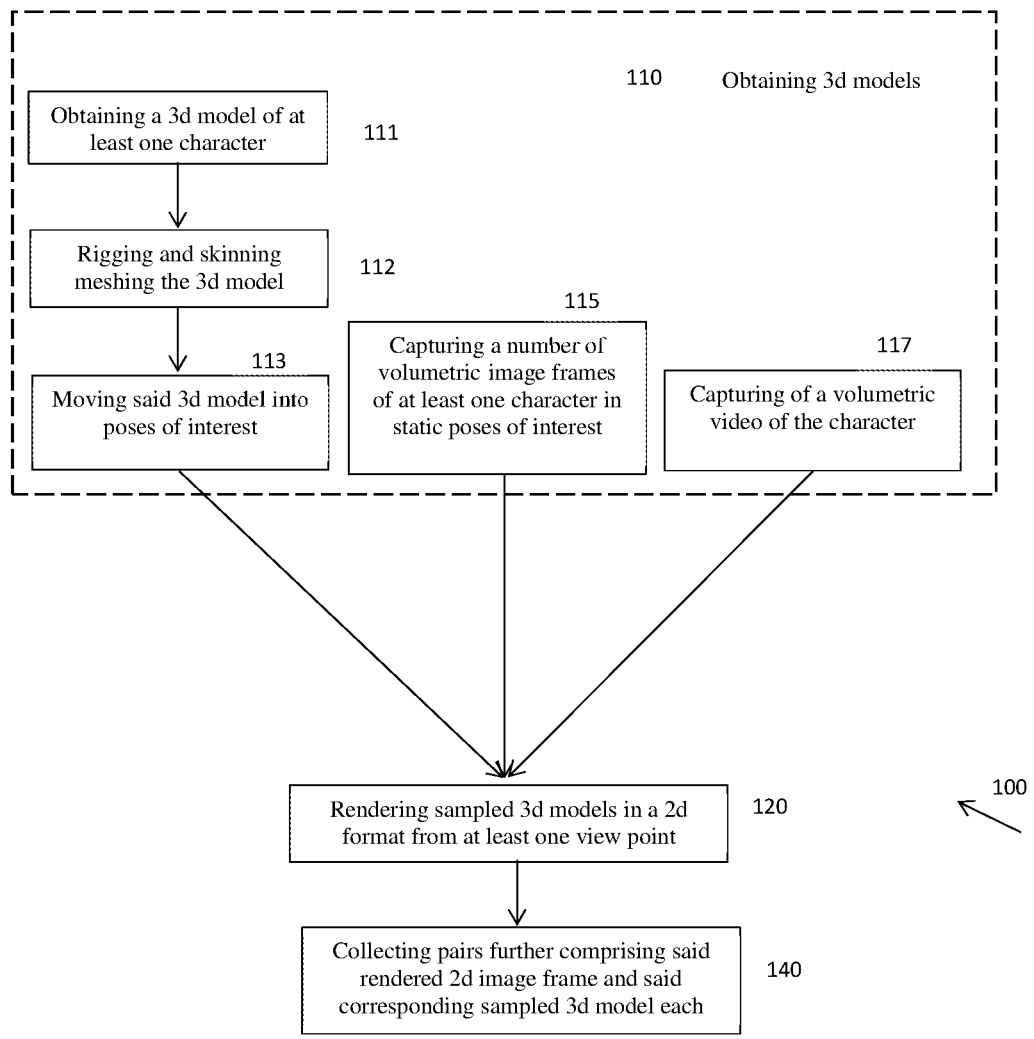
FIGS. 1 to 3 are flowcharts of alternative embodiments of a method of generating a database for training a neural network configured for converting 2d images into 3d models.

Reference is now made to FIG. 1 presenting a flowchart of method 100 of generating of a database for training a neural network configured for converting 2d images into 3d models. Starting step 110 of obtaining 3d models is implemented by at least one of three ways. Referring to the first of three optional ways, a 3d model of the character obtained (step 111). Then, rigging and skinning are applied to the obtained 3d model (step 112). A plurality of image frames can be generated by moving the 3d model into poses of interest (step 113). The other ways of obtaining 3d models is capturing single volumetric image frames of at least one character in different static poses such as a T-pose or an A-pose (step 115) and capturing a volumetric video of at least one character (step 117). The at least one character at sub-steps 111 to 117 can be identical to each other or differs from each other;

The 3d models generated at step 110 form the body of raw data usable for training the neural network. The 3d models obtained at step 110, are rendered into a 2d image format from at least one view point (step 130). Then finally, the pairs formed by the rendered 2d image frame and corresponding sampled 3d models each are collected into the database for training the neural network.

Figure 2:
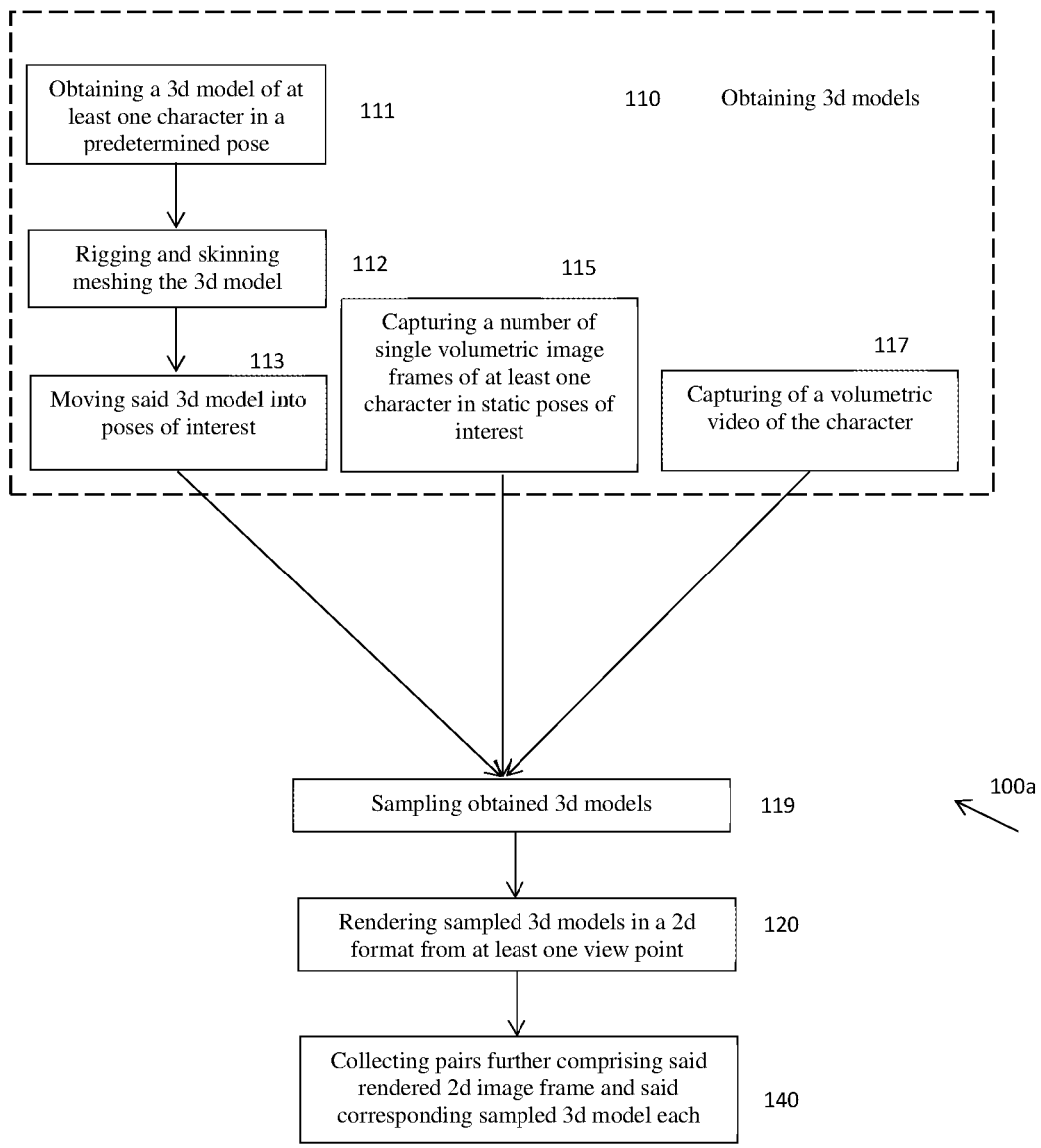
Figure 3:
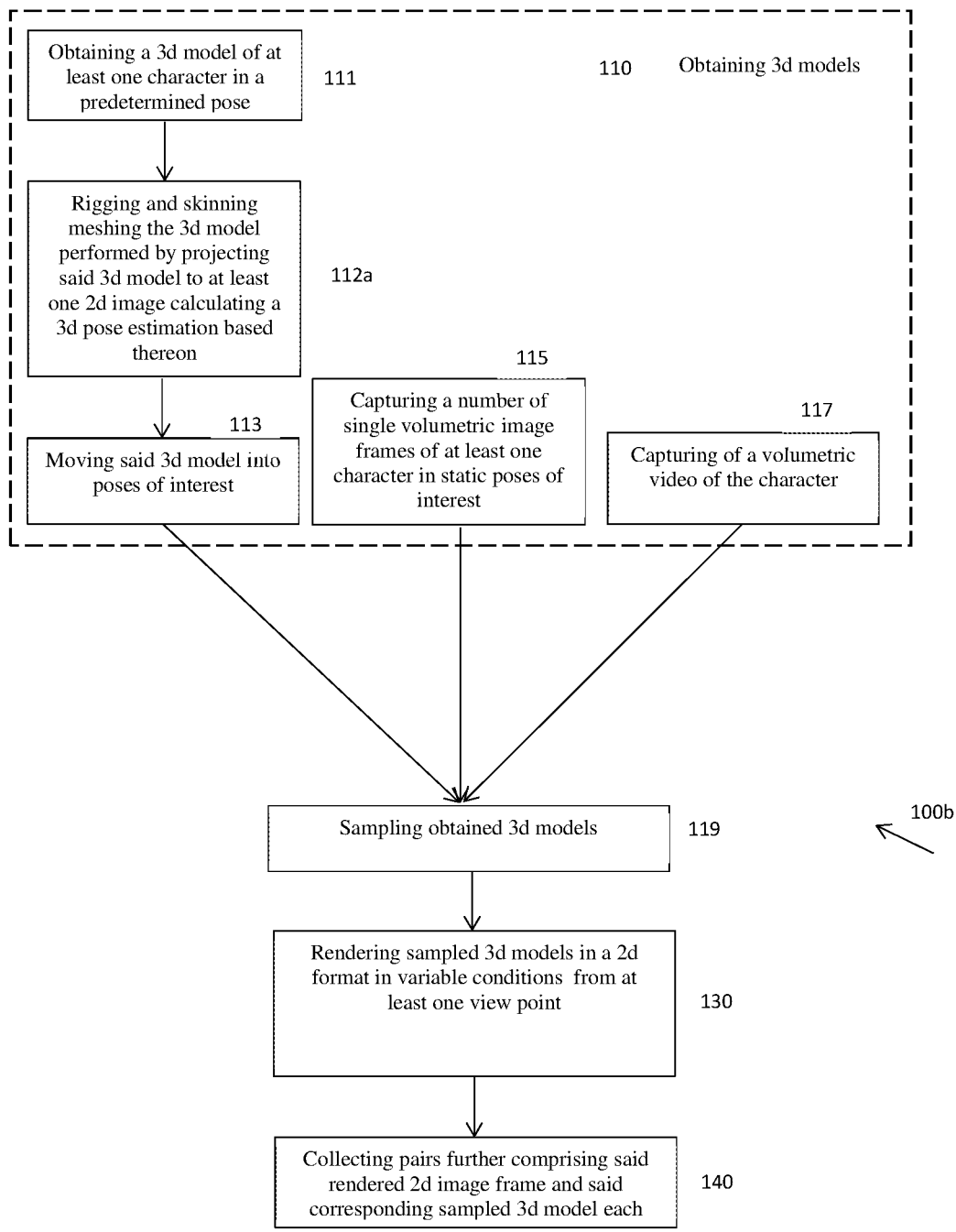

Reference is now made to FIG. 2 presenting a first alternative embodiment 100*a* differing from embodiment 100 in sampling (step 119) a part of 3d models obtained at step 110. The sampled 3d models are rendered in the 2d format (step 130) similar to method 100 om FIG. 1

Reference is now made to FIG. 2 presenting a second alternative embodiment 100*b*. The sub-step 112 of method 100 in FIG. 1 is replaced with sub-step 112*a* of rigging and skinning meshing the 3d model performed by projecting said 3d model to at least one 2d image calculating a 3d pose estimation based thereon. rigging and skinning said 3d model can be performed in an automatic manner.

The system for implementing the abovementioned embodiments 100, 100*a* and 100*b* and a non-transitory computer readable medium comprising instructions to a processor for performing these embodiments are in the scope of the present invention.

The invention claimed is:

1. A computer-implemented method of generating a database for training a neural network, said neural network configured, when trained, for converting 2d images into 3d models; said database comprising a training collection of rendered 2d images and 3d models corresponding thereto; said method comprising steps of:
   a. obtaining said 3d models by means of at least one of the following:
      i. capturing a number of single volumetric frames of said at least one character in static poses and obtaining said 3d model from said number of single volumetric frames; and
      ii. capturing a volumetric video of said at least one character being in motion and obtaining said 3d model from said volumetric video;
         said at least one character at sub-steps i to iii being identical to each other or differ from each other;
   b. generating said rendered 2d image by rendering said 3d model in a 2d image format from at least one view point; and
   c. generating said database by collecting pairs, each of said pairs comprising said rendered 2d image and a corresponding sampled 3d model, said corresponding sampled 3d model comprising at least a portion of said 3d model generated at step (a);
   d. said database training at least one neural network configured to convert at least one 2d image to a 3d model;
   wherein said 3d model obtained at step (a) is an undivided 3d model, obtained directly, without a dummy model.

2. The method according to claim 1, additionally comprising a step of sampling said 3d models obtained at step a.

3. The method according to claim 1, wherein said rigging and skinning of said 3d model is performed by projecting said 3d model to at least one 2d image and calculating a 3d pose estimation based thereon.

4. The system according to claim 3, wherein said rigging and skinning of said 3d model is performed in an automatic manner.

5. The method according to claim 1, wherein at least one of said static poses is a T-pose or an A-pose.

6. A computer-implemented system for generating a database for training a neural network, said neural network configured, when trained, for converting 2d images into 3d models; said database comprising a collection of rendered 2d images and 3d models corresponding thereto; said computer-implemented system comprising:
   a. a processor;
   b. a memory storing instructions which, when executed by said processor, direct said processor to perform steps of:
      i. obtaining said 3d models by means of at least one of the following:
         1. capturing a number of single volumetric frames of said at least one character in static poses and obtaining said 3d model from said number of single volumetric frames; and
         2. capturing a volumetric video of said at least one character being in motion and obtaining said 3d model from said volumetric video;
            said at least one character at sub-steps 1 to 3 being identical to each other or differ from each other;
      ii. generating said rendered 2d image by rendering said 3d model in a 2d image format from at least one view point; and
      iii. generating said database by collecting pairs, each of said pairs comprising said rendered 2d image and a corresponding sampled 3d model, said corresponding sampled 3d model comprising at least a portion of said 3d model generated at step (a);
      iv. said database training at least one neural network configured to convert at least one 2d image to a 3d model;

wherein said 3d model obtained at step (i) is an undivided 3d model, obtained directly, without a dummy model.

7. The system according to claim 6, additionally comprising sampling said 3d models obtained at step i.

8. The system according to claim 6, wherein said rigging and skinning of said 3d model is performed by projecting said 3d model to at least one 2d image and calculating a 3d pose estimation based thereon.

9. The system according to claim 8, wherein said rigging and skinning of said 3d model is performed in an automatic manner.

10. The system according to claim 6, wherein at least one of said static poses is a T-pose or an A-pose.

11. A non-transitory computer readable medium comprising instructions to a processor for performing a method of generating a training database for training a neural network, said neural network configured, when trained, for converting 2d images into 3d models; said instructions comprising steps of:
   a. obtaining 3d models by means of at least one of the following:
      i. capturing a number of volumetric frames of said at least one character in static poses and obtaining said 3d model from said number of volumetric frames; and
      ii. capturing a volumetric video of said at least one character being in motion and obtaining said 3d model from said volumetric video;

said at least one character at sub-steps i to iii being identical to each other or differ from each other;
   b. rendering said 3d models in a 2d image format from at least one view point; and
   c. generating said database by collecting pairs, each of said pairs comprising said rendered 2d image and a corresponding sampled 3d model, said corresponding sampled 3d model comprising at least a portion of said 3d model generated at step (a);
   d. said database training at least one neural network configured to convert at least one 2d image to a 3d model;
wherein said 3d model obtained at step (a) is an undivided 3d model, obtained directly, without a dummy model.

12. The non-transitory computer readable medium according to claim 11 additionally comprising sampling said 3d models obtained at step a.

13. The non-transitory computer readable medium according to claim 11, wherein said rigging and skinning of said 3d model is performed by projecting said 3d model to at least one 2d image and calculating a 3d pose estimation based thereon.

14. The non-transitory computer readable medium according to claim 13, wherein said rigging and skinning of said 3d model is performed in an automatic manner.

15. The non-transitory computer readable medium according to claim 11, wherein at least one of said static poses is a T-pose or an A-pose.

* * * * *